United States Patent [19]

Yates

[11] 4,250,126

[45] Feb. 10, 1981

[54] CHLORINE GENERATOR AND METHOD

[76] Inventor: Dow Yates, Loop 336, Villa Torres, Apt. #75D, Conroe, Tex. 77301

[21] Appl. No.: 49,085

[22] Filed: Jun. 18, 1979

Related U.S. Application Data

[62] Division of Ser. No. 25,291, Mar. 30, 1979.

[51] Int. Cl.$^3$ ............................................... B01F 3/04
[52] U.S. Cl. ..................................... 261/70; 204/149;
204/237; 210/169; 210/220; 261/74; 261/119 R; 261/121 R
[58] Field of Search ............... 261/70, 74, 119 R, 123;
204/98, 128, 237, 149; 210/62, 139, 169, 220

[56] References Cited

U.S. PATENT DOCUMENTS

| | | | |
|---|---|---|---|
| 1,271,181 | 7/1918 | Lenhart | 261/123 |
| 1,594,947 | 8/1926 | Hartman et al. | 261/123 X |
| 1,815,213 | 7/1931 | O'Neill | 261/74 X |
| 2,887,444 | 5/1959 | Lindstaedt | 204/237 X |
| 3,117,066 | 1/1964 | Juda | 204/128 |
| 3,161,590 | 12/1964 | Weis et al. | 261/123 X |
| 3,216,573 | 11/1965 | Irion | 261/123 X |
| 3,223,242 | 12/1965 | Murray | 210/139 |
| 3,291,708 | 12/1966 | Juda | 204/128 |
| 3,351,542 | 11/1967 | Oldershaw et al. | 204/149 |
| 3,361,663 | 1/1968 | Murray et al. | 204/237 X |
| 3,378,479 | 4/1968 | Colvin et al. | 204/237 X |
| 3,669,857 | 6/1972 | Kirkham et al. | 210/169 X |
| 3,756,933 | 9/1973 | Greenberg | 204/237 X |
| 3,775,272 | 11/1973 | Danna | 204/98 |
| 3,793,163 | 2/1974 | Dotson | 204/98 |
| 3,853,720 | 12/1974 | Korach et al. | 204/98 |
| 3,909,378 | 9/1975 | Walmsley | 204/98 |
| 3,975,284 | 8/1976 | Lambert | 210/62 X |
| 4,010,085 | 3/1977 | Carlin | 204/128 |
| 4,035,254 | 7/1977 | Gritzner | 204/98 |
| 4,097,356 | 6/1978 | Yates | 204/237 |

FOREIGN PATENT DOCUMENTS 69201 12/1970 South Africa .

OTHER PUBLICATIONS

Aerion; Pool Security Products, Bulletin Form A-1272 (1972).
Aerion; Pool Security Products, Bulletin Form 01-772 (1974).

Primary Examiner—Richard L. Chiesa
Attorney, Agent, or Firm—Arnold, White & Durkee

[57] ABSTRACT

A chlorine generator is disclosed as including an assembly for an electrolytic cell generating the chlorine and a separate assembly for feeding the chlorine gas into a body of water. The cell assembly preferably includes two separate electrolytic solutions separated by an ion permeable membrane, such that an anode and a cathode are positioned on each side of the membrane. The gas feed assembly is in fluid communication with the cell housing by two separate conduits which accomodate the flow of gas from the cell to the feed assembly, within which the gases are accumulated and intermixed with a portion of water which has been diverted from the main body of water to flow through the feed assembly and then back to the main body of water.

7 Claims, 6 Drawing Figures

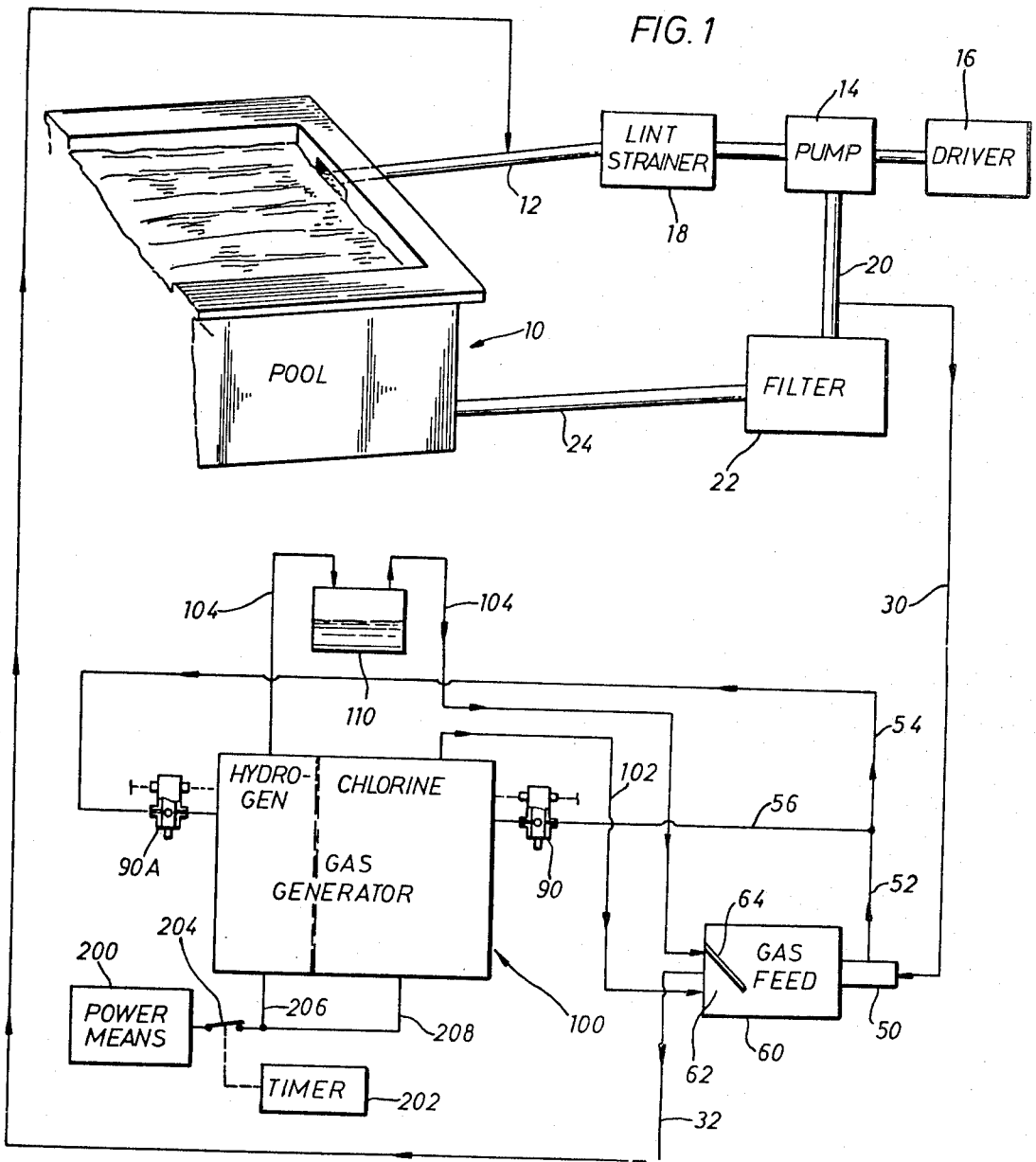
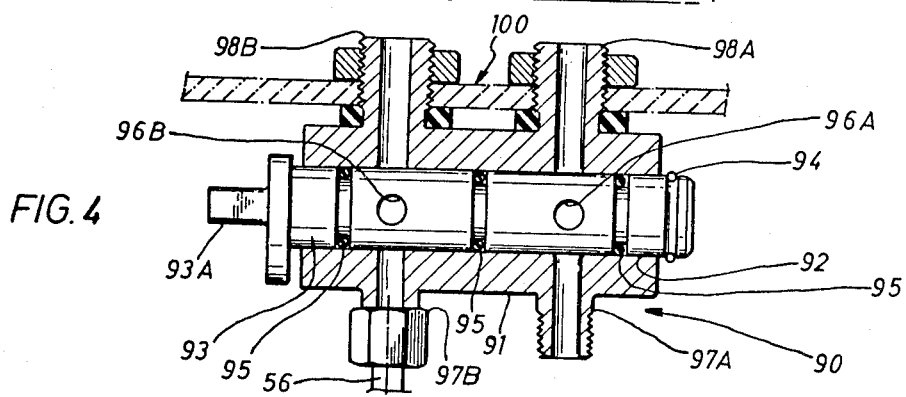
FIG. 1
FIG. 4

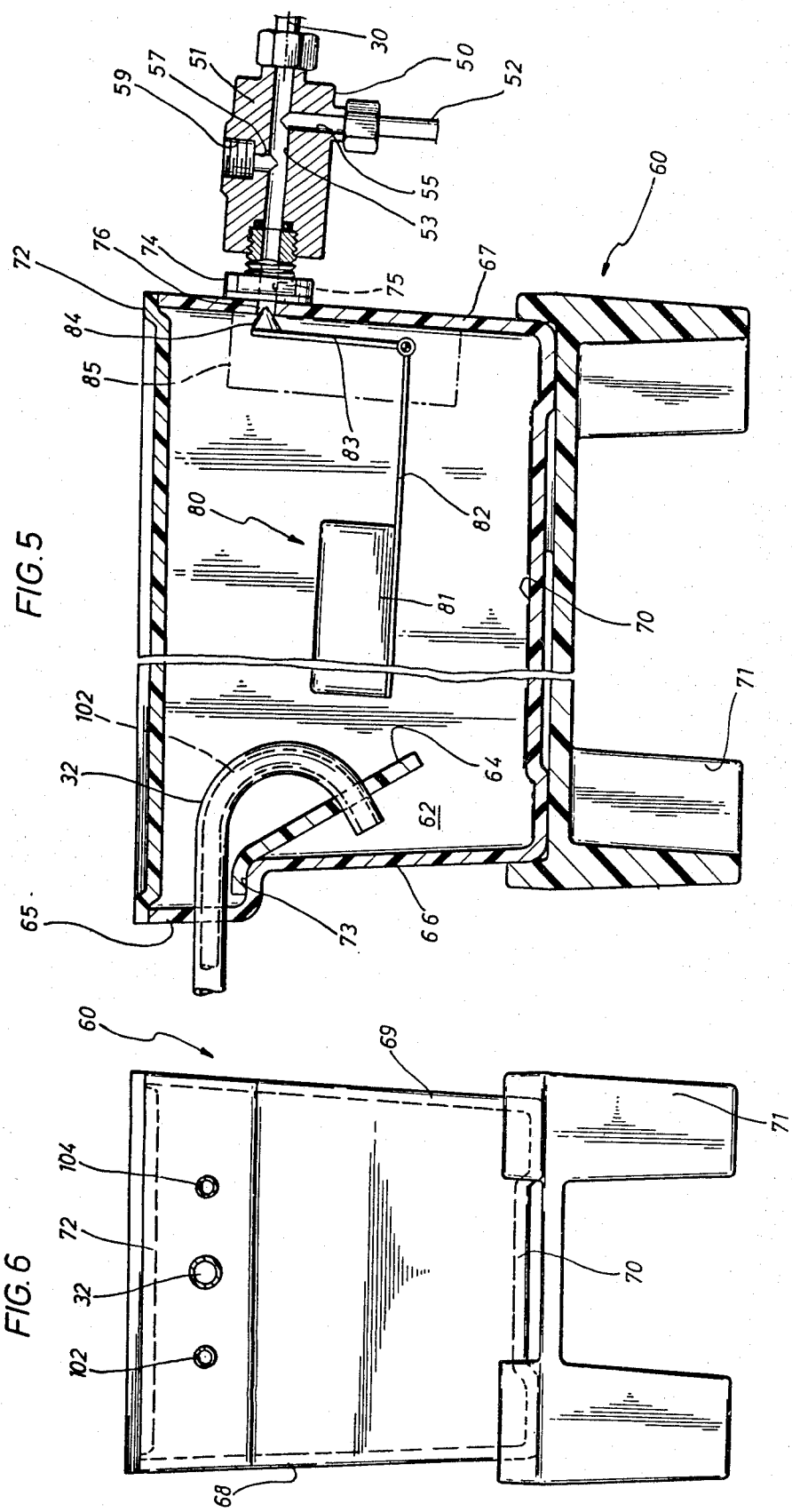

CHLORINE GENERATOR AND METHOD

This is a division of application Ser. No. 025,291, filed Mar. 30, 1979.

CROSS-REFERENCE TO RELATED PATENT AND RELATED PATENT APPLICATION

The present invention is related to a chlorine generator disclosed in applicant's prior U.S. Pat. No. 4,097,356 filed on Sept. 8, 1977 and granted on June 27, 1978, which patent is incorporated herein by reference for all purposes. Additionally, the housings for the invention of this application are disclosed in pending design application No. 019,850, filed Mar. 12, 1979, which is likewise incorporated herein by reference for all purposes.

BACKGROUND OF THE INVENTION

1. Field of the Invention

This invention relates generally to a method and apparatus for the generation of chlorine gas for supply to a body of water, such as a swimming pool, and more particularly to a system including a novel arrangement of an electrolytic cell gas generator and a system for feeding the gases into a flowing stream of water diverted from the main body of water.

2. The Prior Art

The generation of chlorine and its introduction to a water reservoir such as a swimming pool, a cooling tower and the like is the subject of various patents, including U.S. Pat. Nos. 3,351,542 to Oldershaw, 3,669,867 to Kirkham, 2,887,444 to Lindstaedt, and 3,223,242 to Murray. However, these patents disclose generally complicated chlorine generation systems such as the one shown in the Murray patent. Oldershaw includes a system which includes a conceivably dangerous electrolytic solution, such as hydrochloric acid, whereas Lindstaedt requires the addition of sodium chloride to the stream of water which flows directly into the pool. Obviously, the Lindstaedt arrangement and others like it where sodium chloride is injected into a body of water which is to be used by a human is highly undesirable. Kirkham includes a cooling element for one of its electrode compartments within the electrolytic cell, likewise making that structure unnecessarily complicated.

Other known patents relating to electrolytic cells include U.S. Pat. Nos. 3,117,066 and 3,291,708 to Juda, 4,035,254 to Gritzner, 4,010,085 to Carlin and 3,975,284 to Lambert.

U.S. Pat. No. 3,361,663 to Murray even discloses a system for injecting a sanitizing gas into a flowing stream of water for use in a swimming pool. However, the present invention distinguishes significantly from the Murray system to provide the advantages which will be more fully explained and appreciated in further portions of this disclosure.

Additionally, ion permeable membranes used in previous chlorine generation systems have ranged from, for example, asbestos diaphragms to perfluorosulfonic acid membranes such as described in U.S. Pat. No. 3,909,378 to Walmsley. The perfluorosulfonic acid membranes as disclosed in the latter patent have also been described in conjunction with a chlorine generator system in such publications as du Pont Magazine, May-June, 1973, pp. 22-25 and in a paper entitled "Perfluoronated Ion Exchange Membranes" by Grot, Munn and Walmsley, presented to the 141ST National Meeting of the Electro-Chemical Society, Houston, TX, May 7-11, 1972. Additional patents relating to perfluorosulfonic acid membranes used in electrolysis reactions include U.S. Pat. Nos. 3,793,163 to Dotson, 3,775,272 to Danna, and 4,010,085 to Carlin. Another known patent relating to diaphragms for electrolytic cells is U.S. Pat. No. 3,853,720 to Korach.

All the referenced patents and articles referred to above are incorporated herein by reference for all purposes.

Various problems are associated with the prior art type generators. For example, the Lindstaedt patent discloses a system where sodium chloride is injected into the main body of water, and is undesirable as previously discussed. The disclosure of Murray, U.S. Pat. No. 3,361,663, for example, accumulates the gases generated in the electrolytic cell and conveys them by one single line for injection into the flowing stream of water, and potentially creates a hazard of mixing two incompatible gases through the single conduit conveying line. Moreover, the Murray system does not include any provision for sensing the pressure of water flow from the pool filtration cycle, such that gases would continue to be generated even if water pressure were lost from that filtration cycle.

SUMMARY OF THE INVENTION

These and other problems of the prior art are overcome by the present invention, which in one aspect includes a combination chlorine generation and supply assembly. The chlorine generation assembly includes an electrolytic cell having a housing enclosing an anode and a cathode for the generation of gases, including chlorine, and means for accommodating the aspiration of the gases from the housing for supply to the gas feed system.

The gas feed system includes a housing for receiving water from a body of water to be chlorinated and an interior chamber constructed to receive chlorine from the electrolytic cell, to receive water from a major chamber within the feed system, and to accommodate the admixing of the water and the chlorine for injection back into the main body of water. In the preferred structural arrangement of the gas feed system, the feed system housing includes a top enclosure member and a major body component having a bottom, two sides and two ends. The admixing chamber for the water and the chlorine is formed at a first end of the housing by a plate attached to that end at a position toward the top of the housing body such that the plate extends downwardly and toward the other end of the housing. The plate terminates above the bottom to form the admixing chamber between it and the first end of the housing and to provide a passageway for water into the admixing chamber.

The preferred arrangement for the electrolytic cell includes a separator divider to form two separate regions associated with an anode and a cathode. A conduit extends from each of these respective regions to the admixing chamber to separately conduct the gases generated on each side of the electrolytic cell. Most preferably, the electrolytic cell is divided by an ion permeable membrane, formed of a perfluorosulfonic acid polymer, and held in position by a plastic frame.

In the arrangement including the two separate conduits extending from the gas generator to the feed system, a filter is interposed in the line from the cathode in order to remove at least some of the sodium hydroxide conveyed in that line with hydrogen gas from the cathode chamber. The filter includes an enclosure receiving a conduit portion extending from the cell to the filter and a separate conduit portion extending from the filter to the gas feed assembly. With this arrangement, hydrogen and entrained moisture are conveyed to the filter, moisture with entrained sodium hydroxide are deposited in the filter, and hydrogen gas is then conveyed to the gas feed assembly.

In another preferred aspect of the invention, a liquid communication coupling is provided on the gas feed system to receive water from a desired body of water. This coupling includes a first flow line for supplying water to the gas feed system and a second flow line for supplying water to the electrolytic cell so that the cell can be filled or refilled as desired. Most preferably, a flow conduit extends from the second flow line in the coupling and then branches into two sections which exxtend to the separate sides of the electrolytic cell. A dual-purpose valve is provided at the point of interconnection between each respective branch line with the cell, such that the valves selectively supply water to the respective regions of the cell and also simultaneously vent the regions above each electrolytic region as water is being supplied to that region.

Another aspect of this invention includes the provision of a means for sensing the liquid water pressure from the source within the coupling. in the event that an extreme loss of pressure is encountered, the electrolytic cell is deactivated so that gases will not continue to be generated without there being water circulated through the gas feed system to convey the gases into the main body of water.

The method aspect of this invention relates to the manner of injecting chlorine into a desired stream of water. This is accomplished by simultaneously, electrolytically generating chlorine gas and hydrogen gas within an electrolytic cell comprised of an anode and a cathode immersed in an aqueous electrolytic solution. The chlorine and hydrogen gases are collected in respective separate regions in the electrolytic cell, and are then aspirated in response to the naturally occuring pressure and separately conveyed through two individual conduits to a gas feed system, which includes an enclosed housing and an interior chamber into which the gases are directly conveyed. The gases are injected into the desired stream of water by flowing a portion of that stream into the enclosed housing of the gas feed system and into the interior chamber for admixing, whereupon the water and admixed chlorine and hydrogen are then flowed back to the desired stream of water.

When this method and apparatus are used with a swimming pool, the electrolytic cell is typically selectively activated to generate the chlorine and hydrogen gases for supply to the gas feed system. Most preferably, water is diverted from the pool filtration cycle for flow into the gas feed system for admixing with the gases and then for flow back to the filtration cycle.

Accordingly, the present invention provides numerous advantages in the chlorination of water. Among these advantages are:

1. No harmful salts or acids are added to the main body of water.

2. Sodium hydroxide is removed from the hydrogen gas to further reduce the injection of impurities into the main body of water.

3. As a result of the first two advantages, water appearance is improved to provide an enhanced clarity and sparkle.

4. Storage and handling of potentially dangerous chemicals are eliminated.

5. The costs for operating and chlorinating a pool are reduced.

6. The disclosed system is durable and designed for a long operating life and essentially trouble-free service.

7. The disclosed system is automated for simplicity of use.

8. The system is versatile for use in many environments such as swimming pools, water towers, water tanks and reservoirs, cooling towers, solar heating systems, hot baths, and food processing plant sterilization systems.

9. Moreover, the present system is designed to make the chlorine generation system more efficient than the system disclosed in applicant's prior U.S. Pat. No. 4,097,356. For example, the disclosed embodiment of this invention includes a gas feed system different from that disclosed in applicant's prior patent, such that an improved system is provided for better injecting the chlorine gas into the flowing stream of water, such that simplified servicing and operation is provided, and such that a low pressure is developed above the electrolytic cell so that the generation of gases will not be hampered.

10. The present system has the capability of developing significant amounts of chlorine for establishing desired levels of chlorine concentration in water for various disinfectant purposes. For example, it is now felt that concentrations of three parts per million or more of chlorine may be effective in killing Legionnaire's bacteria found in cooling tower sprays.

11. The system is designed for safety by including sensing equipment to maintain small quantities of chlorine within both the generator and the gas feed.

These and other advantages and meritorious features of this invention will be more fully appreciated and understood from the following detailed description and the appended claims.

BRIEF DESCRIPTION OF THE DRAWINGS

FIG. 1 is a schematic illustration, showing the gas generation and feed system as used in connection with a circulating pool filtration cycle.

FIG. 4 illustrates an embodiment of a dual-purpose valve for accommodating the introduction of water into the electrolytic cell regions while at the same time relieving pressure from the electrolytic cell.

FIG. 5 is a side elevational view of the gas feed assembly, illustrating the fluid coupling member receiving water from the pool filtration cycle and supplying water both to the gas feed and to the electrolytic cell. Additionally shown are the float control valve for regulating the introduction of liquid into the gas feed system and the interior gas trap for admixing the chlorine gas with water.

FIG. 6 is an end elevational view of the gas feed assembly, illustrating the positions of the conduits leading to and exiting from the gas trap region of the gas feed assembly.

DETAILED DESCRIPTION OF THE PREFERRED EMBODIMENT

Figure 2:
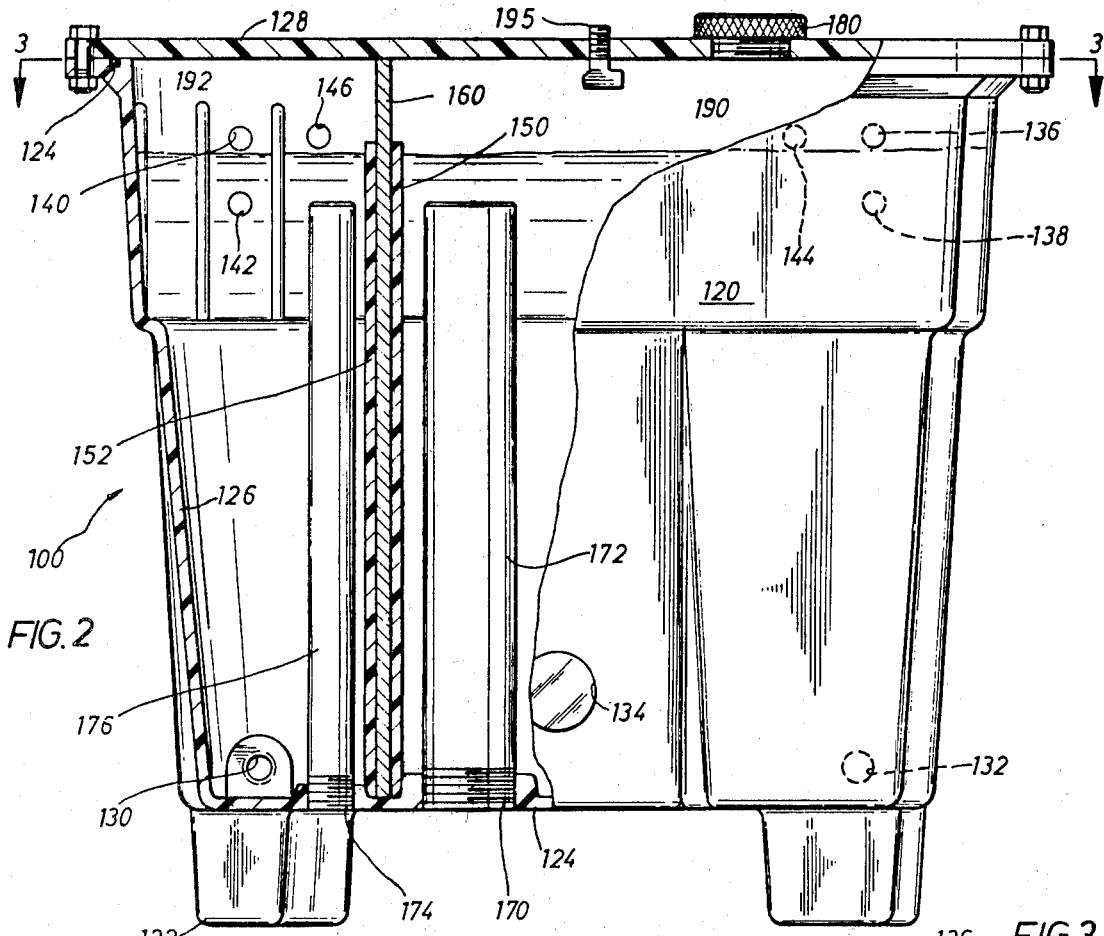
FIG. 2 is a vertical, partial cross-sectional view of the electrolytic cell housing.

The present invention relates to a system for generating and feeding chlorine gas to a desired body of water. FIG. 1 illustrates one of the typical intended uses for this invention as including a swimming pool. The pool filtration and circulation system is conventional and therefore forms no part of the present invention. In such a system, water is withdrawn from pool 10 into flow line 12 by a suction created by pump 14, which is powered by drive member 16. As shown, water flows through pipe 12 into a lint strainer 18 and then into the pump 14 where the flowing water is pumped under pressure through a flow line 20 into a filter 22 and then through return flow line 24 for introduction back into the pool.

In accordance with the present invention, a part of the water under pressure in flow line 20 is diverted into a flow line 30 for flow to a liquid coupling member 50 attached to a gas feed system 60. As will be more fully explained in later portions of this disclosure, water is metered into the gas feed system 60 by a float controlled valve, flows into a gas trap region 62 formed by a downwardly depending plate 64, picks up chlorine and hydrogen gas supplied to the gas trap 62, and flows out of the gas feed system into flow line 32 for introduction back into the pool filter cycle into flow line 12. As will be appreciated, the flow of water through conduit 30 and then back into the filtration system by conduit 32 will occur without the provision of any auxiliary pumping means, because a positive pressure is established in flow line 20, whereas a suction is established in flow line 12 to draw the water back into that line.

The gas generator 100 is depicted schematically with a vertical dashed line to indicate that this member is internally divided into two compartments which respectively include a cathode generating hydrogen and an anode generating chlorine. Chlorine flows from its respective chamber as a result of a positive pressure created in that chamber by the generation of gas and into the gas feed system by a tubular flow conduit 102. Likewise, hydrogen flows from its respective internal chamber in the gas generator into the gas feed by a tubular flow conduit 104. An optional filter 110 may be interposed within the flow line 104 for the purpose of removing impurities, such as sodium hydroxide. This filter 110 is composed of a closed internal chamber receiving an end of the branch line 104 extending from the gas generator and also receiving the end of the branch line 104 which extends from the filter to the gas feed. In the operation of this system, hydrogen with entrained moisture and sodium hydroxide flow into the filter 110, where at least a portion of the moisture and the sodium hydroxide are deposited. Then the hydrogen gas flows back out of the filter and into the terminal portion of flow line 104 into the gas feed system. In actual practice, the filter 110 may include a one-gallon plastic blow-molded container, such as is used for packaging milk, with the plastic top for the gallon container including openings to receive the two end portions of flow conduit 104.

The anode and cathode of the electrolytic cell within the gas generator 100 are powered by D.C. current provided by a power means 200. As disclosed in applicant's prior U.S. Pat. No. 4,097,356, it is not necessary to supply the D.C. current to the generator continuously for most purposes, such as with a home pool, and therefore it is desirable to activate the gas generator intermittently. Accordingly, a timer 202 is provided to selectively open and close a gate 204 to establish electric current flow from the power means through parallel branch lines 206 and 208 which are interconnected with an anode and cathode (not shown in FIG. 1). Since the gas generator of the present invention may be used in various embodiments, it is also desirable to include a rheostat regulator (not shown) to vary the amperage from the power source in order to regulate the gas generation. It has been found that the provision of 20 amps of D.C. current to a gas generator in home pool use is sufficient to establish the optimum 0.6 to 1.0 part per million chlorine content in water with the intermittent operation of the electrolytic cell.

FIG. 1 further illustrates a flow line 52 extending from the fluid connector 50 and branching into separate flow lines 54 and 56 which extend to valves 90 and 90A. These flow lines 52, 54 and 56 are provided so that water may be supplied indirectly from the pool water circulation system by way of flow line 30 in order to fill or refill the respective anode and cathode compartments within the gas generator.

The preferred embodiment of valve 90 is illustrated in FIG. 4 and is intended to be representative of both valves 90 and 90A. The purpose of this valve is not only to accommodate the flow of water under pressure into one of the gas generator compartments, but also to accommodate the relieving of pressure within the interior compartment as water is introduced. The valve includes a body 91 having a vertical cylindrical opening 92 which receives a rotatable, essentially cylindrical valve regulator 93 held in position by snap ring 94 and sealed by O-rings 95. A valve stem 93A is formed at the bottom of the rotatable valve regulator 93 to accommodate manual rotation. Openings 96A and 96B in the valve regulator are aligned with openings in the valve body through threaded, essentially cylindrical connection ports 97A and 97B which respectively provide a pressure relief and a connection for water supply line 56. Similarly, openings 96A and 96B are aligned with openings extending through threaded, essential cylindrical connectors 98A and 98B which are adapted for connection through openings in the wall of gas generator 100.

In the operation of valve 90, water is continuously available through line 56 as a result of the construction of coupling member 50, as will be more fully disclosed in further portions of this application. When it is desired to either fill or refill the appropriate chamber in the gas generator, valve stem 93 is manually rotated approximately 90° from the position shown in FIG. 4 so that openings 96A and 96B are aligned with the openings in cylindrical members 97A–98A and 97B–98B, respectively. In this position, water flows through the opening in cylindrical member 97B, through opening 96B, through the opening in cylindrical member 98B and into the gas generator. Simultaneously, pressure is relieved by the opening through member 98A, the opening 96A and the opening in member 97A. By this arrangement, an undesirable pressure build-up is obviated during a water supply and filling operation.

Figure 3:
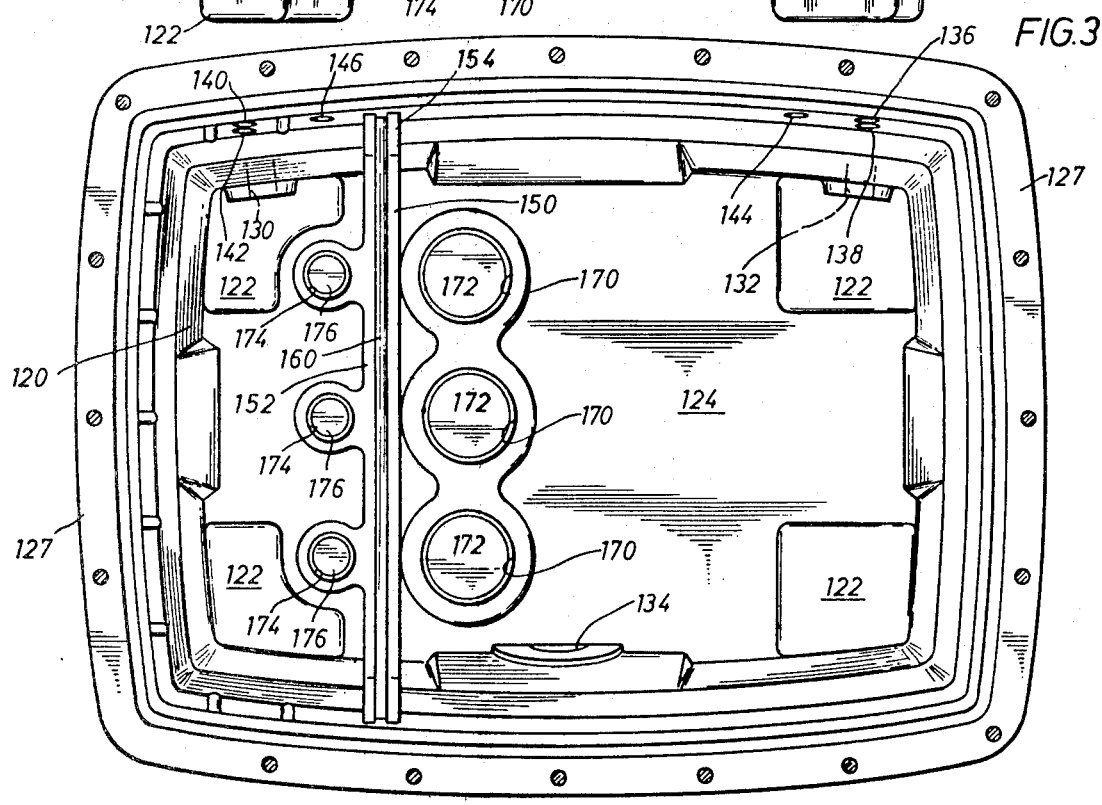
FIG. 3 is a top plan view of the electrolytic cell housing with the lid removed.

Referring now more particularly to FIGS. 2 and 3, the gas generation housing is illustrated with greater particularity. This housing includes a plastic, injection molded base 120 having integral support legs 122 at each of its bottom four corners. In general, the housing further includes a bottom 124 and upwardly extending sidewalls 126 which flare outwardly and terminate at an upper peripheral flange 127, upon which a closure lid 128 is securely fastened to establish internally sealed compartments within the housing 120. Also, in general, the housing 120 includes a pair of drain openings 130 and 132 which are closed by appropriate stop members. An optional sight opening 134 is also provided to receive a transparent viewing member. Openings 136 and 138 are provided to receive the cylindrical members 98A and 98B of valve 90, whereas openings 140 and 142 are provided to similarly receive the identical members of valve 90A. An opening 144 is provided to receive one end of the flow conduit 102 for supplying chlorine gas from the generator to the gas feed. Similarly, an opening 146 is provided to receive an end of flow conduit 104 for supplying hydrogen from the generator to the filter 110 and then to the gas feed system.

Parallel projections 150 and 152 are provided as illustrated to extend downwardly along the back wall of the generator then across the interior bottom wall of the generator and up the inside of the front wall of the generator in order to establish a channel for receiving and retaining a divider member 160. This divider is configured and sized to extend from the bottom of the generator wall up to an abutting relationship with the lid 128 and to extend from the interior of the front to the back walls in order to divide the interior of the housing member 120 into two separate chambers. Further, this divider 160 will preferably be injected molded to support an ion permeable membrane to accomodate the electrolytic action within the generator. The ion permeable membrane is preferably comprised of a fluoronated polymer such as, for example, a perfluorosulfonic acid polymer manufactured by E. I. du Pont Co. and sold under the trademark Nafion. As discussed in applicant's prior U.S. Pat. No. 4,097,356, such a material has the characteristic of permitting the transfer of sodium ions across the membrane from the anode compartment to the cathode compartment, while preventing the intermixing of the electrolytic solutions in the respective compartments.

As best seen in FIG. 3, three threaded openings 170 are provided in the bottom wall of the housing 120 and receive threaded ends of elongated cylindrical anodes 172. Preferably, the anodes are formed of carbon material, but may be formed of any material such as gold, silver or platinum to generate the desired chlorine gas during operation.

Similarly, three additional threaded openings 174 are provided in the bottom wall of the housing 120 and receive the threaded ends of respective cathodes 176. These cathodes are preferably formed of stainless steel material but likewise may be formed of carbon, carbon steel or other suitable metals as may be desired in order to enhance the production of chlorine gas in the anode compartment. In operation, hydrogen gas will in actuality be formed in the cathode compartment.

The electrolytic cell formed by the gas generator setup as previously described will be operated in the following fashion. Valves 90 and 90A will be manually operated to accomodate the flow of water from liquid connector 50 through lines 52, 54 and 56 into the anode and cathode compartments within the housing 120. During this filling operation, air will be vented through the openings 98A, 96A, and 97A to prevent a pressure build-up. When water flows through vent 97A, it is known that the chamber is full, and therefore the valves are then manually closed. Sodium chloride is then added to the anode chamber by removing a cap 180 from lid 128. The system is then ready for operation through the supply of D.C. current from the power means as appropriately operated by a timer mechanism 202. As D.C. current is supplied, chlorine gas is generated by the anodes 172 and are accumulated in a chamber region 190 formed between the top surface of the liquid and the lid 128. At the same time, hydrogen gas is generated in the cathode compartment and is accumulated in a chamber region 192 above the liquid level in that chamber and below the lid 128. As previously described, these gases are naturally aspirated through lines 102 and 104 for transfer to the gas feed system as a result of the pressure built up due to the generation of gases. Typically, a pressure of about 0.5 pounds will be developed within the chamber regions 190 and 192.

An optional pressure sensor 195 may be provided through the lid 128 to sense the pressure of the chlorine gas within chamber region 190, as more fully described in applicant's prior U.S. Pat. No. 4,097,356.

Preferably, the electrical powered system will be interconnected with only one of the anodes and one of the cathodes, since it has been found that such an interconnection is sufficient for producing adequate quantities of chlorine gas for use in home pools. This interconnection may then be changed later when either the anode or cathode have experienced deterioration. Alternatively, the power source may be interconnected with all three anodes and all three cathodes in the event that greater quantities of chlorine gas are desired.

Referring now to FIGS. 5 and 6, the gas feed system 60 of this invention is illustrated with greater particularity. The gas feed includes a major plastic body portion 65 which is essentially rectangular in vertical cross section, as shown in FIG. 5. By comparing FIGS. 5 and 6, it will be seen that body portion 65 includes two end walls 66 and 67, two side walls 68 and 69, and a bottom wall 70, which rests upon a support stand 71. A top closure lid 72 is seated along the top edge of the side and end walls to form an enclosed compartment to receive the chlorine and hydrogen gases from flow lines 102 and 104 and the water from coupling member 50.

As discussed in connection with FIG. 1, a gas trap region 62 is formed by downwardly depending plate 64, which may be a plastic material and secured in a suitable fashion to a lip region 73 formed on end wall 66.

Liquid coupling member 50 is secured to the other end 67 of the gas housing by a connector element 74 which includes an internal opening 75 mating with a fluid flow opening 76 in end wall 67. The coupling member 50 includes a body 51 having a first major internal flow opening 53 extending laterally through the body member to establish fluid communication between flow line 30 and the flow opening 75 in connector element 74. Additionally, a secondary flow opening 55 branches off of flow opening 53 for supplying water to flow line 52 in order to supply water to branch lines 54 and 56 and then to separate anode and cathode compartments of the gas generator 100 as previously disclosed. Further, a port 57 extends vertically up from flow conduit 53 and terminates in a threaded opening 59 to receive a conventional pressure sensing device (not shown). Such a pressure sensing member may be interconnected, for example, with the cathode electrical connection 206 by appropriate electrical connections (not shown) in order to override the timer element 202 and deactivate the gas generator in the event that a pressure loss is experienced in flow line 53. With this arrangement, chlorine gas will not be supplied to gas trap 62 unless water can be supplied to the gas feed system to transport the chlorine gas into the major body of water.

Inside the housing 65 a float controlled valve 80 is provided to regulate the flow of water into the gas feed system. This flow control assembly forms no part of the present invention and is therefore shown somewhat schematically as including a float member 81 rigidly interconnected with a pivotal arm 82 which is in turn rigidly interconnected with arm 83. A valving element 84 is connected to pivotal arm 83 to seat within either opening 76 or an alternative supplementary member which may be interconnected in the interior of housing 65 for mounting the float controlled valve assembly. As also shown schematically, the valve assembly is pivotally connected and supported by internal support plate 85.

FIG. 6 illustrates the positions that conduits 32, 102 and 104 are inserted into the gas feed housing 65. FIG. 5 illustrates that the conduits 32, 102 and 104 extend into the interior of housing 65 above the gas trap region 62 and are curved downwardly to extend through appropriate openings in plate 64 and into the gas trap 62.

In the operation of the gas feed assembly, water will be supplied to the interior of housing 65 by way of flow line 30 in order to maintain a desired water level. As will be appreciated, this water level will be regulated by the float control assembly 80 such that when the water level drops, float 81 will respond by pivoting arms 82 and 83 in a counterclockwise direction, unseating valve member 84 and accomodating the flow of water. Likewise, as the water level rises in the gas feed housing 65, float 81 will rise to pivot arms 82 and 83 in a clockwise direction to shut off the flow of water. During the supply of D.C. current to the gas generator, hydrogen and chlorine gases will be supplied to the gas trap region 62 by way of separate flow lines 102 and 104. As the gases are introduced into this region, they are admixed with water and flow out of housing 65 by flow conduit 32. As water and gases exit through line 32, the water level in housing 65 drops and additional water is metered into the assembly by the manner previously disclosed in connection with float valve 80.

As will be appreciated by those skilled in the art, various modifications may be made to the disclosed embodiment without departing from the true scope of the invention. For example, the configuration of the gas trap 62 may be varied to take on a conical shape formed by a separate component placed within the gas feed system, such that the gases would be conveyed into the conical shaped chamber and water could flow into the bottom of the conical member to convey the gases with the water back to the main body of water.

Alternative power means and control systems could be employed to achieve the same results as provided in the present invention. As will be appreciated by comparing the present drawings and applicant's design patent application Ser. No. 019,850, the top control portion of the gas generator is not illustrated in this application for purposes of conciseness. The position or arrangement of the control means could be varied, for example, to include a chlorine sensor as set forth in applicant's prior U.S. Pat. No. 4,097,356 to replace the timer control 202.

The present embodiment has been described primarily as being formed of plastic material, but other materials such as fiberglass can be employed. The primary consideration is that such other materials not be deteriorated by sodium hydroxide or chlorine.

Other more minor changes may also be made. For example, the valve arrangement within the gas feed may be modified as desired. A shield may be provided around the anode, in the manner as disclosed in applicant's prior U.S. Pat. No. 4,097,356. Additionally, cooling means may be provided internally of the gas generator to reduce the temperature of the electrolytic solution, particularly in embodiments where the generator is increased in size to produce greater quantities of chlorine.

Having therefore completely and sufficiently described my invention, I now claim:

1. A feed system for intermixing gaseous chlorine with a supply of water for use in chlorinating a desired body of water, comprising:
   (a) a housing defining an enclosed major chamber for receiving the flow of water and an enclosed minor chamber formed as a part of the major chamber to receive both the gaseous chlorine and the flow of water, the major and minor chambers being in fluid communication by an unrestricted flow path free of any flow regulation means such that the water supplied to the main chamber may freely flow into the minor chamber;
   (b) a first conduit in fluid communication with the minor chamber for supplying the gaseous chlorine thereto from a source, said first conduit being free of any flow regulation means such that gaseous chlorine may freely flow into the minor chamber for mixing with water;
   (c) a second conduit in fluid communication with the minor chamber for conveying water and intermixed chlorine from the housing to the desired body of water, said second conduit being free of any flow regulation means such that the water and intermixed chlorine may flow unrestricted into said second conduit;
   (d) means for supplying a stream of water to the major chamber; and
   (e) a control valve for regulating the flow of water from the supply means to the major chamber in order to maintain an essentially constant volume of water within both said major and minor chambers.

2. The system as defined in claim 1 characterized by the control valve including a pivotally mounted, float-operated member to regulate the flow of water into the housing.

3. The system as defined in claim 1, further including a means for sensing the pressure of water at the water supply means in order to deactivate the chlorine generation source in the event that a pressure loss is experienced at the water supply means.

4. The system as defined in claim 3, characterized by said means supplying water to the major chamber further including a port for supplying water to the chlorine generation source.

5. The feed system as defined in claim 1, further including a third conduit in fluid communication with the minor chamber for supplying gaseous hydrogen to the water so that the hydrogen may be conveyed to the desired body of water for release, the third conduit being free of any flow regulation means such that the hydrogen gas may freely flow into the minor chamber for mixing with water.

6. The feed system as defined in claim 5, characterized by the first and third conduits each being laterally spaced on opposed sides of the second conduit at the point of communication with the minor chamber.

7. A feed system for intermixing gaseous chlorine with a supply of water for use in chlorinating a desired body of water, comprising:

(a) a plastic housing defining an enclosed major chamber for receiving the flow of water and an enclosed minor chamber to receive both the gaseous chlorine and the flow of water, the major and minor chambers being in fluid communication such that the water supplied to the main chamber may flow into the minor chamber, the housing including a top lid component and a major body component having a bottom, two ends and two sides and the minor chamber being formed at one end of the housing body by a plate attached to that end of the body housing at a position toward the top of the housing body such that the plate extends downwardly and toward the other end of the housing body, with the plate terminating at a position above the bottom to provide a flow path for water from the major chamber into the minor chamber and the minor chamber being defined between the plate and the end to which the plate is attached;

(b) a first conduit in fluid communication with the minor chamber for supplying the gaseous chlorine thereto from a source;

(c) a second conduit in fluid communication with the minor chamber for conveying water and intermixed chlorine from the housing to the desired body of water;

(d) means for supplying a stream of water to the major chamber; and (e) a control valve for regulating the flow of water from the supply means to the major chamber in order to maintain an essentially constant volume of water within the housing.

* * * * *